United States Patent Office 3,063,897
Patented Nov. 13, 1962

3,063,897
ANALGESIC COMPOSITIONS CONTAINING o-ETHOXYBENZAMIDE WITH SALICYLAMIDE OR WITH A MIXTURE OF SALICYLAMIDE AND ACETYL-p-AMINOPHENOL
Jane F. Emele, Morris Plains, N.J., assignor to Warner-Lambert Pharmaceutical Company, Morris Plains, N.J., a corporation of Delaware
No Drawing. Filed Nov. 19, 1958, Ser. No. 774,813
3 Claims. (Cl. 167—65)

This invention relates to pharmaceutical compositions comprising o-ethoxybenzamide

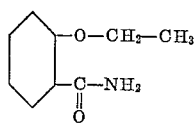

and relates more particularly to pharmaceutical compositions for oral and parenteral administration comprising the combination of o-ethoxybenzamide with an analgesic compound selected from the group consisting of salicylamide and mixtures of salicylamide with acetyl-p-aminophenol.

Compositions containing acetyl salicylic acid have been known for many years and have been widely used as analgesics in the relief of pain associated with headache, neuralgia and the like and as antipyretics. The use of aspirin has, on occasions, been associated with undesirable side-effects and in recent years there has been considerable interest in developing new and improved analgesic and antipyretic compounds. In current medical research such materials as salicylamide and acetyl-p-aminophenol have been extensively investigated as substitutes for aspirin.

It has now been discovered that compositions comprising as active analgesic ingredients a combination of o-ethoxybenzamide with a member selected from the group consisting of salicylamide and mixtures of salicylamide and acetyl-p-aminophenol are excellent analgesics and antipyretics and exhibit an unexpected synergistic effect above and beyond the expected additive analgesic effect of the components comprising said compositions. This discovery of this unexpected synergism is not only useful but its application in therapeutics is highly desirable since it enables smaller quantities of the individual analgesics to be used to produce a given analgesic effect thus minimizing the possibility of any undesirable side effects due to dosage levels or individual sensitivity.

The compositions prepared in accordance with this invention, in addition to the analgesics may include a suitable pharmaceutical carrier to form dosage unit forms such as tablets, capsules, syrups, elixirs, parenteral solutions and suspensions, as well as suppositories and the like. The combined active analgesic ingredients in a dosage unit will normally be from about 100 to about 750 milligrams. The ratio by weight in which each is present in the composition will normally be from about 10 to about 200 parts by weight of o-ethoxybenzamide per 100 parts by weight of salicylamide or the mixture of salicylamide and acetyl-p-aminophenol employed.

o-Ethoxybenzamide can be easily prepared by treating salicylamide with ethyl bromide in an alcohol solution in the presence of sodium ethoxide as catalyst. The ethyl ether of salicylamide, that is o-ethoxybenzamide, is precipitated from the reaction mixture in good yields by the addition of water.

The procedure best suited to the determination of the analgesic activity of a compound is a modification of that described by E. A. Siegmund et al., J .Pharmacol. and Exper. Therap., 119, 184 (1957). Female mice weighing 18 to 24 grams are used. The "writhing syndrome," which is characterized by periodic twisting of the lower half of the trunk, contractions of the muscles in the pelvic area and extension of the hind legs with elevation of the base of the tail, is produced by the intraperitoneal injection of 0.25 cc. of a 0.02% solution of phenyl-p-quinone in 5% ethyl alcohol. All mice writhe within 10 minutes after administration of phenyl-p-quinone. In carrying out the test, three groups of ten mice each are used. A different dose of the analgesic to be investigated is administered orally to each group. 15 minutes later, each group is challenged with phenylquinone. A dose response curve is obtained by basing observations on an all-or-none response during the 10 minute period after injection of phenylquinone. The amount of the analgesic, expressed as milligrams per kilogram of body weight at which 50% of the test mice show no writhing is determined from the dose response curve and reported as the $ED_{50}$ (effective dose) for the material being studied. This test procedure affords a reliable and convenient method for evaluating the analgesic properties of various compounds. The lower the $ED_{50}$, the more effective the material is as an analgesic.

The $ED_{50}$ for the following compounds as determined by the above described test procedure are tabulated below.

TABLE I

| Compound: | $ED_{50}$ (mg./kg.) |
|---|---|
| Acetyl-p-aminophenol | 280 |
| Salicylamide | 200 |
| Aspirin | 150 |
| o-Ethoxybenzamide | 100 |

The following table presents the results of tests of the analgesic activity of compositions comprising o-ethoxybenzamide as evaluated by the phenylquinone wirthing test in mice described above. Each composition is the $ED_{50}$ (mg./kg.) dose, or is that amount of the composition necessary to prevent writhing in 50% of the test mice. The quantity of each compound in the compositions is also shown as a fraction of the $ED_{50}$ (mg./kg.) amount for the respective compound as tabulated in Table I.

TABLE II

| | Composition | Amount of Compound (mg./kg.) | Fraction of $ED_{50}$ Amount for Compound | Synergism |
|---|---|---|---|---|
| A | o-ethoxybenzamide | 30 | 0.30 | |
| | Salicylamide | 100 | 0.50 | |
| | Sum of fractions | | 0.80 | Yes. |
| B | o-ethoxybenzamide | 50 | 0.50 | |
| | acetyl-p-aminophenol | 210 | 0.75 | |
| | Sum of fractions | | 1.25 | No. |
| C | o-ethoxybenzamide | 33 | 0.33 | |
| | Aspirin | 112 | 0.75 | |
| | Sum of fractions | | 1.08 | No. |
| D | o-ethoxybenzamide | 25 | 0.25 | |
| | Salicylamide | 50 | 0.25 | |
| | acetyl-p.aminophenol | 70 | 0.25 | |
| | Sum of fractions | | 0.75 | Yes. |
| E | o-ethoxybenzamide | 25 | 0.25 | |
| | Salicylamide | 100 | 0.50 | |
| | Aspirin | 75 | 0.50 | |
| | Sum of fractions | | 1.25 | No. |

The results shown in Table II establish the synergistic effect achieved with combinations of o-ethoxybenzamide with salicylamide as well as with mixtures of salicylamide and acetyl-p-aminophenol. The synergism is clearly demonstrated by the fact that the sum of the fractions of the $ED_{50}$ for each compound in the compositions is less than one. Where the sums of the fractions exceeds one, the analgesic effect is neither additive nor synergistic.

The results in Table II further demonstrate the specific nature of the synergistic effect observed since only compositions A and D showed synergism whereas compositions B, C and E not only showed no synergism but were not even additive in the analgesic effect of the compounds.

In order further to illustrate this invention, the following examples are given:

Example I

Salicylamide, 137 grams, is reacted for 6 hours with 109 grams of ethyl bromide in boiling ethyl alcohol in the presence of 68 grams of sodium ethoxide. The alcohol is removed by distillation and the product precipitated with water. The product is recrystallized from 50 percent aqueous ethyl alcohol. A yield of 110 grams of o-ethoxybenzamide, melting point 129° C., is obtained.

Example II

| Tablets: | G. |
|---|---|
| o-Ethoxybenzamide | 150 |
| Salicylamide | 350 |
| Methylcellulose | 30 |
| Starch | 30 |
| Stearic acid | 6 |
| Starch | 34 |
| Guar gum | 12 |

The first four ingredients are blended, granulated with 160 ml. water, air-dried and screened through a No. 16 screen. The last three ingredients are added, blended and the mixture compressed into 612 mg. tablets, each containing 150 mg. o-ethoxybenzamide and 350 mg. salicylamide.

Example III

| Tablets: | G. |
|---|---|
| o-Ethoxybenzamide | 20 |
| Salicylamide | 50 |
| Acetyl-p-aminophenol | 70 |
| Starch | 17 |
| Stearic acid | 3 |
| Starch | 7 |

The first four ingredients are blended, granulated with 60 ml. of water, air dried and screened through a No. 16 screen. The last two ingredients are added, blended and the mixture compressed into 167 mg. tablets, each tablet containing 20 mg. o-ethoxybenzamide, 50 mg. salicylamide and 70 mg. acetyl-p-aminophenol.

Example IV

| Capsules: | G. |
|---|---|
| o-Ethoxybenzamide | 55 |
| Salicylamide | 110 |
| Acetyl-p-aminophenol | 160 |

The ingredients are ground, blended and triple screened through a No. 80 screen. No. 1 colorless hard gelatin capsules are each filled with 325 mg. of the blend, each capsule containing 55 mg. o-ethoxybenzamide, 110 mg. salicylamide and 160 mg. acetyl-p-aminophenol.

Example V

| Capsules: | G. |
|---|---|
| o-Ethoxybenzamide | 75 |
| Salicylamide | 250 |

The ingredients are blended, ground and triple screened through a No. 80 screen. No. 1 hard gelatin capsules are each filled with 325 mg. of blend, each capsule containing 75 mg. o-ethoxybenzamide and 250 mg. salicylamide.

Example VI

| Suppositories: | G. |
|---|---|
| o-Ethoxybenzamide | 125 |
| Salicylamide | 250 |
| Cocoa butter | 1950 |

The first two ingredients are stirred into molten cocoa butter and mixed thoroughly. The mixture is poured into chilled suppository molds and allowed to solidify. Each suppository (2.3 g.) contains 125 mg. o-ethoxybenzamide and 250 mg. salicylamide.

Any departure from the foregoing description that conforms to the present invention is intended to be included within the scope of the claims.

I claim:

1. An analgesic composition for oral administration in dosage unit form containing a solid pharmaceutical carrier and as active ingredients the combination of o-ethoxybenzamide with at least one member of the group consisting of salicylamide and mixtures of salicylamide and acetyl-p-aminophenol, said active ingredients being present in the relative proportion of about 10 to about 200 parts by weight of o-ethoxybenzamide for every 100 parts by weight of the other component, with each dosage unit containing from about 100 to about 750 milligrams of the combination of o-ethoxybenzamide with said added component.

2. Composition in accordance with claim 1 wherein the active ingredients consist of the combination of o-ethoxybenzamide with salicylamide.

3. Composition in accordance with claim 1 wherein the active ingredients consist of the combination of o-ethoxybenzamide with a mixture of salicylamide and acetyl-p-aminophenol in about equal parts by weight.

References Cited in the file of this patent

UNITED STATES PATENTS

| 2,694,088 | Sahyun et al. | Nov. 9, 1954 |
| 2,744,916 | Sahyun et al. | Mar. 8, 1956 |
| 2,754,327 | Sahyun et al. | July 10, 1956 |
| 2,764,614 | Meyer | Sept. 25, 1956 |
| 2,822,391 | Suter et al. | Feb. 4, 1958 |
| 2,872,370 | Berger | Feb. 3, 1959 |

OTHER REFERENCES

Coates et al.: J. Pharm. and Pharmacol., December 1957, pp. 855–863.

Randall et al.: J.A.P.A., Scientific Ed., vol. 47, No. 5, May 1958, pp. 313–314.

Boxill et al.: J.A.P.A., Scientific Ed., vol. 47, No. 7, July 1958, pp. 479–487.

Chemical Abstracts (1), vol. 47, 1953, p. 1850(f) Carron et al. (Lab. Robert and Carriere Co., Paris), Therapie 7, No. 1, 27–36, 1952.

C.A. (2), vol. 48, p. 9541(d), 1954; P. Preziosi (Univ. Naples), Boll. Soc. ital. biol, sper. 29, 1443–45 (1953).

C.A. (3), vol. 47, p. 8038(c), 1953; Bavin et al., J. Pharm. and Pharmacol. 4, 872–8, discussion 878 (1952).